United States Patent
Yamamoto et al.

(10) Patent No.: US 8,544,374 B2
(45) Date of Patent: Oct. 1, 2013

(54) SCRIBE DEVICE, SCRIBE METHOD, AND TIP HOLDER

(75) Inventors: Masao Yamamoto, Suita (JP); Atsushi Tabata, Suita (JP)

(73) Assignee: Mitsuboshi Diamond Industrial Co., Ltd., Suita (JP)

( * ) Notice: Subject to any disclaimer, the term of this patent is extended or adjusted under 35 U.S.C. 154(b) by 809 days.

(21) Appl. No.: 12/095,413

(22) PCT Filed: Dec. 1, 2006

(86) PCT No.: PCT/JP2006/324058
§ 371 (c)(1), (2), (4) Date: Feb. 23, 2009

(87) PCT Pub. No.: WO2007/063979
PCT Pub. Date: Jun. 7, 2007

(65) Prior Publication Data
US 2009/0308219 A1 Dec. 17, 2009

(30) Foreign Application Priority Data

Dec. 1, 2005 (JP) ................................. 2005-348256
Sep. 22, 2006 (JP) ................................. 2006-256769

(51) Int. Cl.
*B31B 1/25* (2006.01)
(52) U.S. Cl.
USPC ............................................. 83/880; 83/886
(58) Field of Classification Search
USPC ............. 83/880, 665, 667, 884, 886; 225/96
See application file for complete search history.

(56) References Cited

U.S. PATENT DOCUMENTS

| | | | | | |
|---|---|---|---|---|---|
| 1,808,944 | A | * | 6/1931 | Brown | 279/91 |
| 2,315,524 | A | * | 4/1943 | Hubbell Minott P | 279/62 |
| 2,707,849 | A | * | 5/1955 | De Vore | 30/164.95 |
| 2,847,225 | A | * | 8/1958 | Kobinski | 279/103 |
| 3,160,043 | A | * | 12/1964 | Judd, Jr. | 83/886 |
| 3,340,783 | A | * | 9/1967 | Edminster | 404/121 |
| 3,461,755 | A | * | 8/1969 | Gerew et al. | 83/886 |
| 3,570,336 | A | * | 3/1971 | Galla | 83/886 |
| 3,682,027 | A | * | 8/1972 | Insolio et al. | 83/886 |
| 3,791,660 | A | * | 2/1974 | Bostley | 279/20 |
| 3,850,063 | A | * | 11/1974 | Witkoski | 83/886 |
| 4,098,156 | A | * | 7/1978 | Insolio | 83/886 |
| 4,102,227 | A | * | 7/1978 | Simko | 83/881 |
| 4,221,150 | A | * | 9/1980 | Bergfelt et al. | 83/882 |

(Continued)

FOREIGN PATENT DOCUMENTS

| EP | 0 230 642 A2 | 8/1987 |
|---|---|---|
| JP | 61-191438 | 11/1986 |

(Continued)

*Primary Examiner* — Sean Michalski
(74) *Attorney, Agent, or Firm* — McGlew and Tuttle, P.C.

(57) ABSTRACT

A tip 14 is rotatably attached to a tip holder 10. The tip holder 10 is made into a cylindrical shape and its end has an installation part 16. An opening is arranged at a holder joint. The tip holder 10 is attracted by a magnet for attachment so that detaching and attaching can be performed easily. Tip offset data is recorded as a 2-dimensional code 17 on the surface of the tip holder 10. When replacing the tip holder, the offset data is read out and inputted to a scribe device, thereby canceling the offset. This eliminates the operation required for correction when attaching/detaching the tip holder and enables easy tip replacement during a short time of device stop.

14 Claims, 19 Drawing Sheets

(56) References Cited

U.S. PATENT DOCUMENTS

| | | | | |
|---|---|---|---|---|
| 4,383,460 A | * | 5/1983 | Schotter et al. | 83/886 |
| 4,742,470 A | | 5/1988 | Juengel | |
| 4,856,177 A | * | 8/1989 | Takeuchi et al. | 483/9 |
| 5,050,106 A | * | 9/1991 | Yamamoto et al. | 700/225 |
| 5,331,877 A | * | 7/1994 | Ishii | 83/886 |
| 5,513,264 A | * | 4/1996 | Wang et al. | 380/51 |
| 6,032,861 A | * | 3/2000 | Lemelson et al. | 235/456 |
| 6,311,790 B1 | * | 11/2001 | Beckwith et al. | 175/62 |
| 6,536,121 B1 | | 3/2003 | Ishikawa et al. | |
| 6,832,439 B2 | | 12/2004 | Ishikawa | |
| 2012/0279373 A1 | * | 11/2012 | Heo | 83/884 |

FOREIGN PATENT DOCUMENTS

| | | |
|---|---|---|
| JP | 1990-78171 | 6/1990 |
| JP | 02-205445 | 8/1990 |
| JP | 3 74143 | 7/1991 |
| JP | 6-71344 | 9/1994 |
| JP | 07-001270 | 1/1995 |
| JP | H07-205057 | 8/1995 |
| JP | 07-237067 | 9/1995 |
| JP | 2000-001326 | 1/2000 |
| JP | 2000-86262 | 3/2000 |
| JP | 2000-119030 | 4/2000 |
| JP | 2000-264657 | 9/2000 |
| JP | 2001-019452 | 1/2001 |
| JP | 2001-246548 | 9/2001 |
| JP | 2004-010452 | 1/2004 |
| JP | 2004-189556 | 7/2004 |
| JP | 2005-213116 | 8/2005 |
| KR | 1994-0013729 | 7/1994 |
| KR | 2001-87145 | 9/2001 |
| KR | 2005-0032834 | 4/2005 |

* cited by examiner

F I G. 4
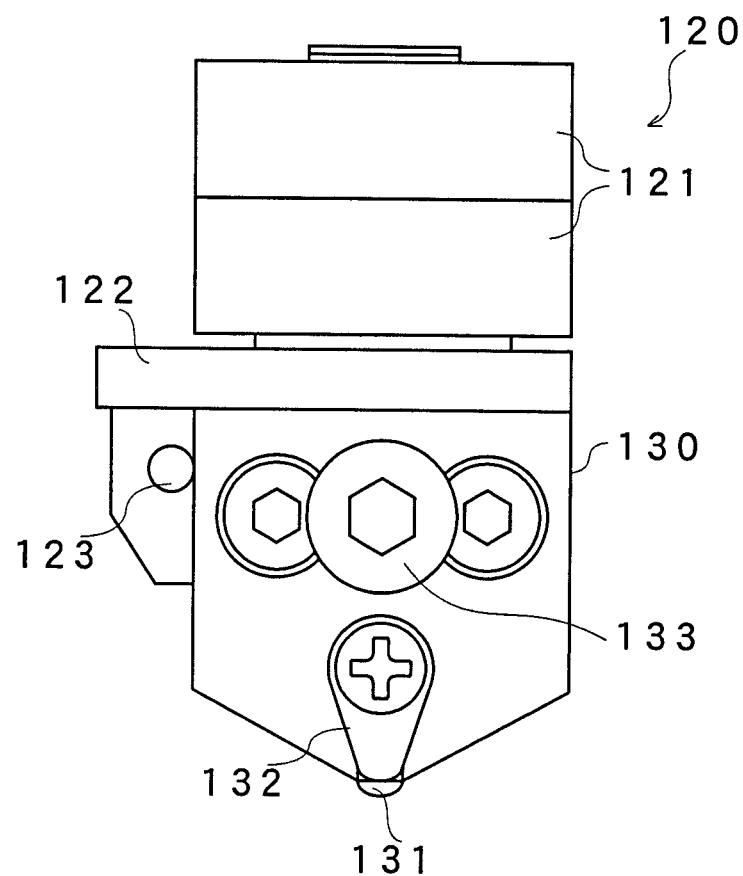

F I G. 8
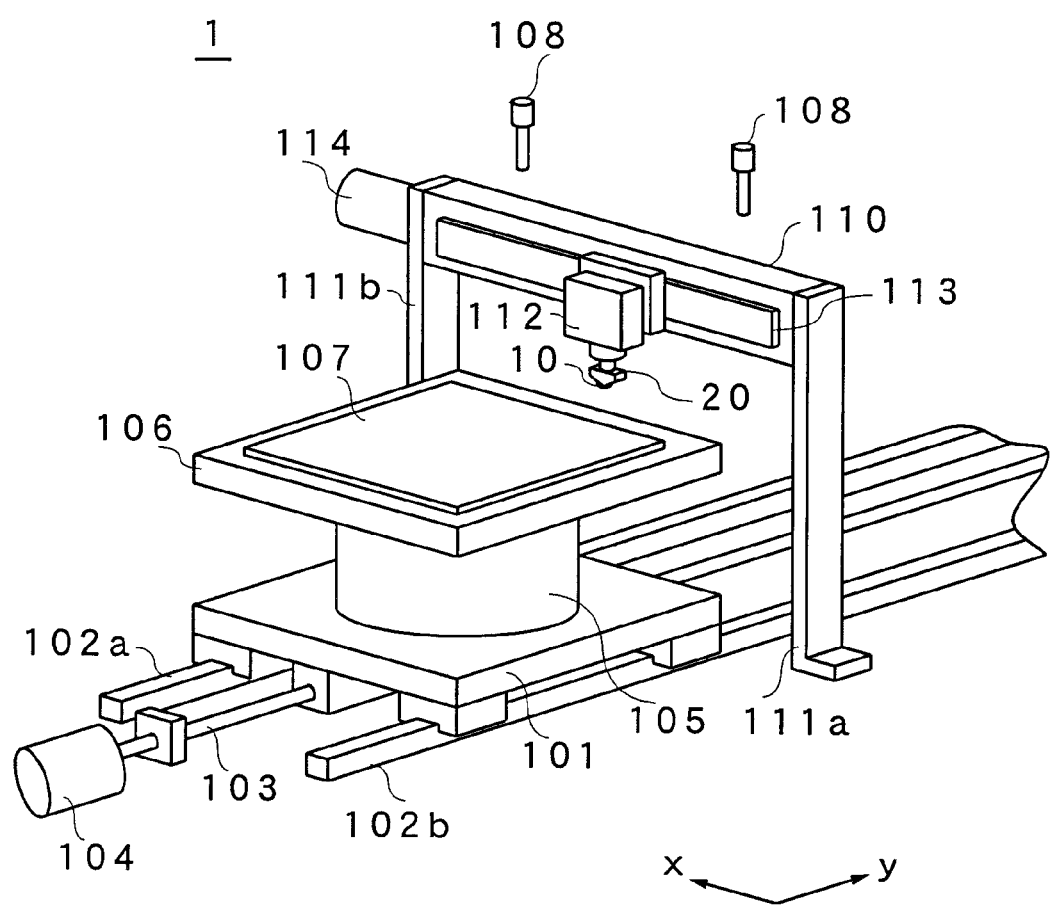

F I G. 1 2
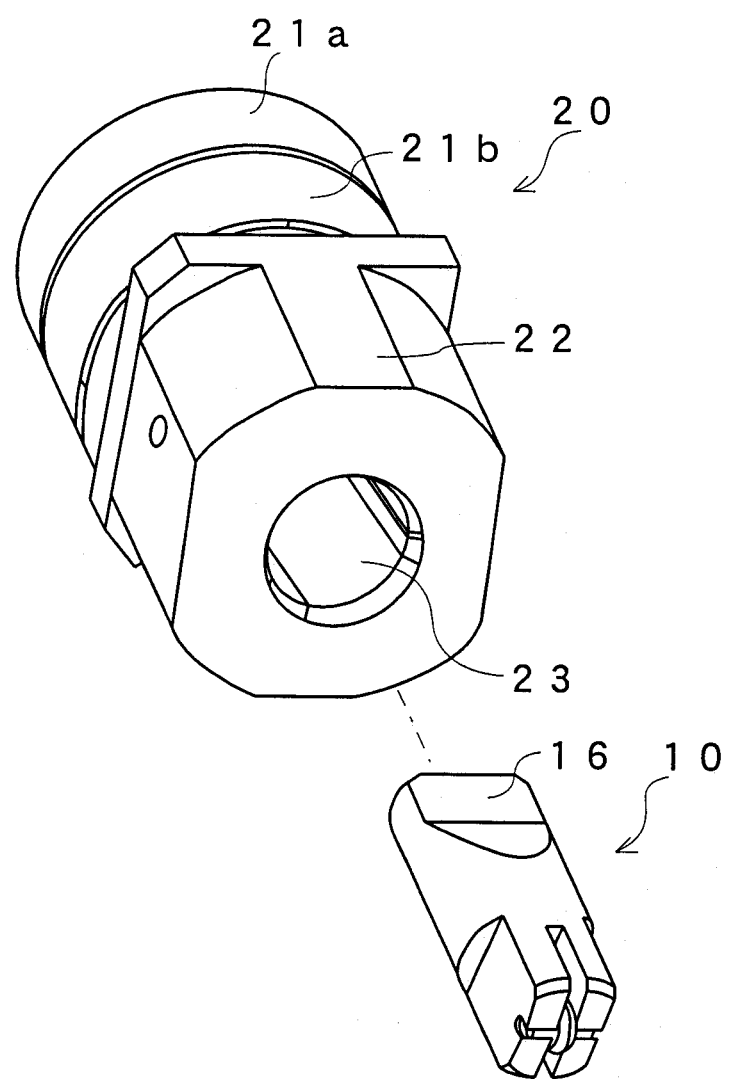

F I G. 1 5
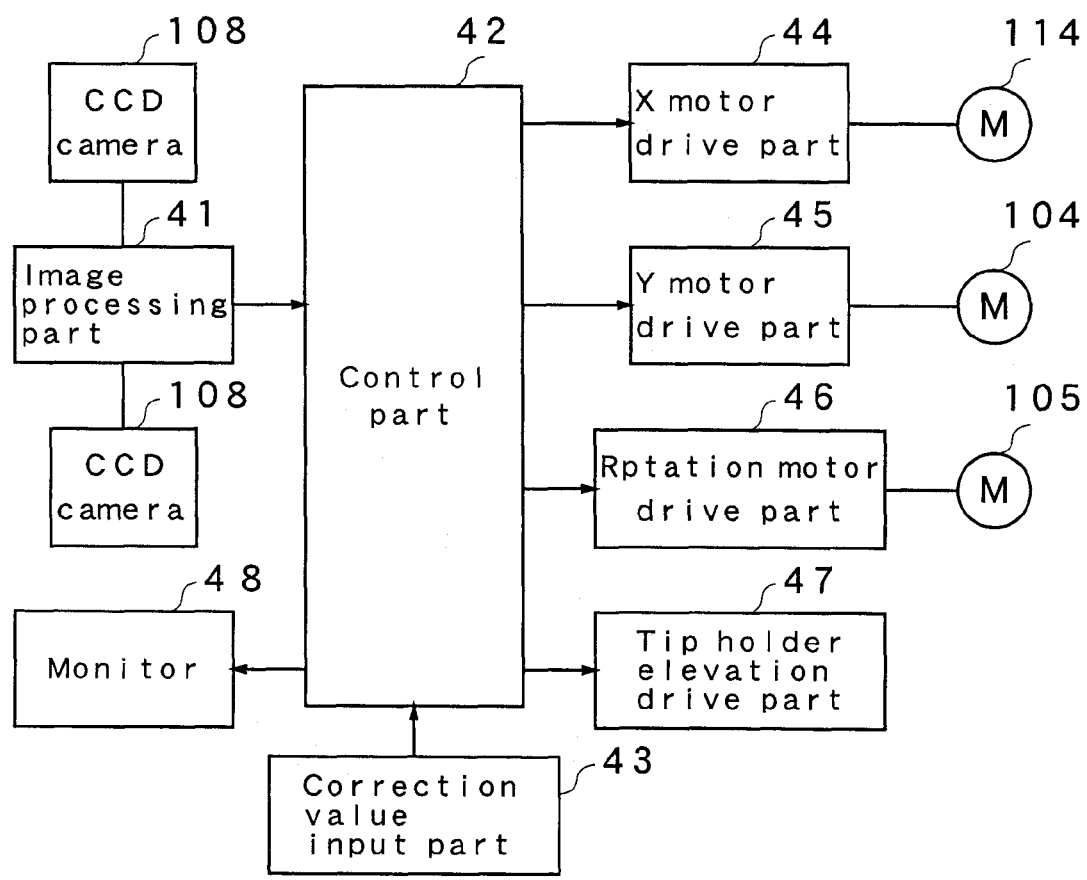

F I G. 1 7
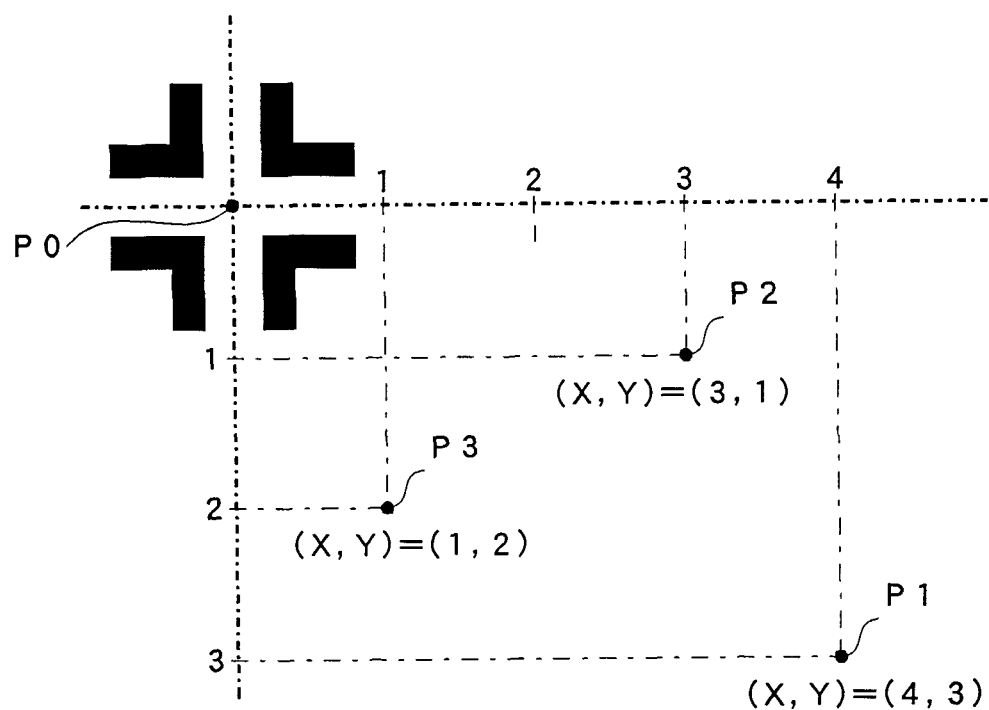

SCRIBE DEVICE, SCRIBE METHOD, AND TIP HOLDER

TECHNICAL FIELD

The present invention relates to a scribe device and a scribe method for forming a scribe line on a brittle material substrate and a tip holder used thereto, and especially relates to a scribe device, scribe method, and tip holder having a feature in a tip holder for retaining a wheel tip (a scribing wheel) used for formation of a scribe line.

BACKGROUND ART

Flat panel displays such as a liquid-crystal display panel and a liquid-crystal projector substrate are conventionally broken so as to be divided into separate panels of a predetermined size after mother glass substrates are bonded each other in a manufacturing step. The process of breaking a brittle material substrate such as this mother glass includes a scribe process and a break process, and a scribe device is used in the scribe process.

FIG. 1 is an outlined perspective view showing an example of a conventional scribe device. This scribe device 100 retains a moving base 101 to be freely movable in y axis direction along a pair of guide rails 102a and 102b. A ball screw 103 is fitted to the moving base 101 with screwing each other. The ball screw 103 revolves due to drive by a motor 104, and moves the moving base 101 in the y axis direction along the pair of guide rails 102a and 102b. A motor 105 is provided on an upper surface of the moving base 101. The motor 105 rotates a table 106 on a xy plane and positions the table at a predetermined angle. A brittle material substrate 107 is placed on the table 106 and retained by a vacuum suction means and the like which are not shown in the figure. Two CCD cameras 108 for imaging alignment marks of the brittle material substrate 107 are provided in an upper portion of the scribe device.

A bridge 110 is installed by support poles 111a and 111b along x axis direction so as to stride the moving base 101 and the table 106 on the base in the scribe device 100. A scribe head 112 is able to move in the direction of x axis along a guide 113 included in the bridge 110. A motor 114 is a drive source for moving the scribe head 112 along the x axis direction. A tip holder 130 is attached to a tip portion of the scribe head 112 via a holder joint 120.

A conventional holder joint and tip holder attached to the scribe head 112 will be explained next. As an exploded perspective view shown in FIG. 2, the holder joint 120 has a bearing 121 at its upper portion, and has a holder unit 122 where its under portion is formed in a L-shape. A lateral portion of the holder unit 122 includes a positioning pin 123. The tip holder 130 retains a discoid wheel tip (hereinafter referred to as a tip merely) 131 rotatably as shown in FIG. 3 and FIG. 4. The tip 131 is retained rotatably at an end portion in centre of bottom by a pin (not shown in the figure), and the pin is prevented from dropping due to a catcher 132. The tip 131 rotates to form a scribe line with being pressed to contact a brittle material substrate. This tip holder 130 is positioned on the holder part 122 of the holder joint 120 by contacting its side surface with the positioning pin 123. Then the tip holder 130 is fixed to the holder unit 122 by a fixing bolt 133. The scribe head 112 retains the holder joint 120 and the tip holder 130 in its underneath so as to move up and down. The scribe head 112 includes an elevation unit for allowing the moving up and down such as, for example, an air cylinder using an air pressure control or an electric elevation unit employing a linear motor, internally. The elevation unit rotates the tip 131 on a surface of a brittle material substrate with pressing the tip at an appropriate pressure to contact the substrate, and forms a scribe line.

A scribe operation of the scribe device where electrical and mechanical adjustments necessary for the scribing operation is completed after assembling will be described next. FIG. 5A and FIG. 5B are flowcharts showing a procedure of this processing. Firstly, the brittle material substrate 107 is placed on the table 106 before the scribing operation starts as shown in FIG. 6 and is sucked and secured after being positioned (step S0). And then, in order to check a positioning status, positioning alignment marks 63a and 63b on two points in right and left parts on the substrate are imaged with being enlarged respectively by using two CCD cameras 108 installed in upper portion of the scribe device, and image processing is performed (step S1). Since the enlarged picture imaged above is respectively displayed on corresponding monitors, an operator is able to realize an accurate positioning operation with confirming the imaged pictures. The scribe device 100 detects magnitudes of an angular degree (θ) at which the substrate 107 inclines with respect to a line connecting the two CCD cameras, i.e., a reference line A and of misaligned placement of the substrate 107 with respect to an origin position as a reference of the table 106 by image processing (step S2). Progressing to step S3, the scribe device 100 corrects an incline angle θ of the table 106 on the basis of the detection result by means of rotation of the motor 105 so that the angle can be zero. The misalignment with respect to the origin position of the table 106 can be corrected as follows. Regarding the y axis direction, the table 106 is moved to the y axis direction only in a distance equal to a component of the y axis direction of aforementioned misalignment distance, and regarding the x axis direction, a position of the scribe head 112 is moved only in a distance equal to a component of the x axis direction of aforementioned misalignment distance. In addition, there is another correction method described below. A start position of the scribe can be shifted by the scribe device, which divides aforementioned misalignment distance into an x axis component and a y axis component and corrects values of the respective axis components of a position data of the start position of the scribe operation. This provides an equal effect.

It is necessary to perform the correction operation for aforementioned misalignment distance every time a substrate to be scribed is replaced. Upon finishing the correction operation, the scribe operation starts from a desired position. The scribe device 100 lowers the tip holder, contacts the tip to a substrate and moves the tip holder to rotate the tip and to perform a normal scribe (steps S5 to S7). After forming a scribe line, the scribe device 100 raises the tip holder (step S8), then relatively moves the substrate (step S9), and the operation returns to step S5.

The moving of the substrate shown in step S9 will be explained in detail with referring to FIG. 5B. The scribe device 100 judges whether or not a flag FX that is control data in a control program is zero first (step S10). This flag FX is a flag placed in rotating the table and indicates zero after initialization. When the flag FX indicates 0, it is judged whether or not the scribing in the x axis direction has been completed progressing to step S11. When not completed, the scribe device 100 relatively moves the substrate by moving the table 106 (step S12), and the same operation is repeated returning to step S5. This allows the scribe in the x axis direction to be completed by repeating this loop. When the scribe in the x axis direction has been completed, the scribe device 100 sets the flag FX to be 1 progressing to step S13 and turns the table 106 in right direction at 90 degrees progressing to step S14. The scribe device judges whether or not scribe in the y axis direction has been completed at step S15, and moves the table 106 progressing to step S16 when not completed, and the operation returns to step S5. Since the flag FX is placed after the scribe in the x axis direction is completed, the scribe device 100 judges whether or not the scribe in the y axis direction has been completed progressing from step S10 to step S15. When the scribe has not been completed, the scribe device 100 relatively moves the substrate in parallel to the y axis direction only in necessary move distance (step S16). After that, the same scribe operation is repeated returning to step S5 again. When determining that formation of the entire scribe line in the y axis direction has been completed at step S15, the scribe device 100 turns the table 106 in left direction at 90 degrees and completes the scribe operation. The scribe device 100 resets the flag FX, and the substrate is released from the suction and removed from the table 106 (step S17). When another substrate is placed on the table subsequently, the scribe operation is performed also in accordance with the same procedure.

It is required to perform the correction operation for misalignment distance by a method mentioned below when the holder joint 120 is installed to the newly produced scribe device 100, when, after uninstalling the tip holder 130, scribe head 112 and holder joint 120 to which the tip 131 is installed for the purpose of adjustment, fixing, or change while using the scribe device, they are installed and used again after the adjustment, and when another component is installed and used after replacement. Supposing following adjustments are already completed in this case for ease of explanation, the explanation will be continued. It is supposed that a central coordinate of an imaged picture of one camera among the two CCD cameras is adjusted so as to agree with the origin position necessary for the formation of the scribe line and that a scribe line formed by the tip after installing components such as the tip holder is preliminarily adjusted so as to be parallel with the reference line of the x axis direction of the table.

Test scribe is required in order to accurately detect misalignment between an origin position of a drive system of the scribe device 100 and a start position where the formation of a scribe line actually starts with the tip 131 on a substrate. When performing the test scribe, an operator places a dummy substrate other than a normal mother substrate on the table 106 and preprocessing from step S0 to S3 is performed. FIG. 7 is a pattern diagram showing a relationship between a scribe line formed on the dummy substrate at the test and a central coordinate P0 of an alignment mark of an imaged picture of a CCD camera. When each offset of the scribe head 112, the holder joint 120, and the tip holder 130 is corrected and cancelled, the scribe device 100 is able to start the scribe from the central coordinate P0.

Electrical and mechanical errors, however, exist and values of the errors are different in respective assembly components, and consequently the scribe from the central coordinate P0 cannot be performed if errors after installation are not measured again and a necessary correction operation is not completed. The operator lowers the tip holder 130 and contacts the tip to the dummy substrate in this condition (steps S5' and S6'). And, the operator performs the test scribe on the dummy substrate to form one scribe line (S7'). After that, the operator raises the tip holder (S8') and measures misalignment distance (S9'). It is supposed here that a scribe start position (X,Y) is a position P1(X,Y)=(4,3) as shown in FIG. 7. This position can be measured by using a picture imaged by the CCD cameras 108.

The operator measures a misalignment distance from the position P1 to the central coordinate P0 next (S9'). This misalignment distance is a value to be cancelled as an offset, and a correction operation is performed by using the value as a correction value (S10'). The operator then removes the dummy substrate from the table and the correction operation is completed (S11'). After that, the same operation is repeated returning to step S0. According to this, the scribe can be started from the central coordinate P0 in the normal scribe after step S5 shown in FIG. 5A.

When the correction operation is performed in this manner, a scribe line on the brittle material substrate 107 is formed accurately on a position of a predetermined line (for example, a line B in FIG. 6) by performing the preprocessing of steps S1 to S3 every time a substrate to be scribed is changed after the correction operation and a scribe operation is repeated with sequentially changing a scribe start position with respect to the same substrate 107 (steps S5 to S9).

Since worn after scribing a brittle material substrate for a predetermined distance and deteriorating its performance, the tip needs to be replaced regularly (Patent document 1). When replacing a consumable tip in a conventional scribe device, an operator uninstalls the tip holder 130 from the scribe head 112 first. The operator uninstalls the worn tip 131 from the uninstalled tip holder 130 and installs a new tip to the tip holder 130 next. After that, the operator installs the tip holder 130 to the scribe head 112 again to complete a replacement operation. Since errors (offset) occur at an installation position of the tip even when one of the tip, the tip holder, and the scribe head is replaced, the test scribe and the subsequent correction operation (steps S5' to S11') are required to balance the offset out.

The offset occurred in replacement of peripheral components of the scribe head is corrected as described above, and, after performing the preprocessing from step S0 to step S3 with respect to a normal mother substrate, the necessary number of scribe lines are formed by repeating the sequential scribe-related operation from step S5 to step S9.

The scribe device 100 in which the scribe head moves in the x axis direction and the table moves in the y axis direction and turns has been described here. Some scribe devices, however, have a table which moves in the x and y axis directions and also turns (Patent document 2). In addition, other scribe devices have tables which move in the x and y axis directions but no turn mechanism. Furthermore, there is a type of a scribe device in which a table is secured and a scribe head moves in the x and y axis directions (Patent document 3).

As a modified example of the scribe device shown in FIG. 1, there is a type of a scribe device which does not have a turn table on the moving base 101 and directly places the brittle material substrate 107 on the moving base (device type 1). As further another modified example, there is a type of a scribe device which has a secured table 106 in FIG. 1 and includes a drive mechanism for moving the bridge 110 with the support poles 111a and 111b in the y axis direction (device type 2, for example, Patent document 4). This case requires the following scribe operation. That is to say, since the incline angle θ of the substrate 107 detected at step S2 in FIG. 5A cannot be corrected, only a correction operation for misalignment distance of the substrate is performed at step S3. A scribe operation according to the method of linear interpolation explained by referring to FIG. 6 is performed instead of the correction of θ in this scribe device. Specifically, when only the scribe head 112 merely moves in the x axis direction in a case where a regular scribe line is assumed to be formed at a position of a straight line B, nothing can be obtained but a line of a straight line A. This scribe device moves the table 106 in the case of the device type 1 and the bridge 110 in the case of the remaining device type 2, respectively, concurrently with the moving of the scribe head in the x axis direction. An inclined scribe line B can be formed in this manner. The move distance of the concurrently moving depends on a magnitude of the incline angle θ. In the inclined scribe line, the scribe head 112 and the table 106 (or the bridge 110) share the move distances equal to the base and the height of a triangle formed at the incline angle θ, and, in other words, it can be realized by repeating a minimally stepwise linear move formed of lines in two directions.

Patent document 1: Japanese Patent Publication No. 3074143
Patent document 2: Japanese Unexamined Patent Publication No. 2000-119030
Patent document 3: Japanese Unexamined Patent Publication No. 2000-086262
Patent document 4: Japanese Unexamined Patent Publication No. 2000-264657

DISCLOSURE OF INVENTION

Problems to be Solved by the Invention

When replacing a tip installed in a tip holder conventionally, an operator loosens the fixing bolt 133 and uninstalls the tip holder 130 from the holder joint 120 at first. And then, the operator takes out of the pin by loosening a bolt of the catcher 132 and displacing the catcher 132 from a pin hole, and retrieves the tip 131. After replacement to a new tip, the operator installs the tip in the tip holder 130 by inserting the pin in a similar process, and installs the tip holder 130 to the holder joint 120 as shown in FIG. 4. The operator subsequently installs the holder joint 120 to the scribe head 112.

In the case of replacement of a tip as described above, operations from S0 to S3 and from S5' to S11' in FIG. 5 should be performed. This requires an operation of a test formation of a scribe line using a dummy substrate once in order to correct an offset associated with the replacement and an operation of obtaining the offset and correction thereof, and these processes are troublesome as a fault.

The tip size varies depending on its application, for example, in a case of scribing a laminated substrate for a liquid crystal display, the tip size is approximately 2.5 mm in diameter and the size of the pin is 0.5 mmφ and the tip is too small to be treated. The conventional replacement operation for a tip has a fault of taking a long time. In addition, in a panel-processing plant using various tips by installing them in various devices, there has been a possibility of accidentally installing a wrong tip of different type. Also there has been a fault in that case that, despite changing of a scribe condition resulting in abnormal or unstable scribe, it is hard to find the cause immediately. In addition, there has been a fault that formation positions of scribe lines formed by an installed tip fluctuate since an installation position of the tip is slightly misaligned depending on a fixing manner when a tip holder is fixed to a holder joint by a fixing bolt.

The present invention is proposed on the basis of problems of a conventional scribe device and scribe method and intends to solve such problems by using a tip holder integrated with a tip and having the tip holder retain offset data in a code style.

Means to Solve the Problems

To solve the problems, a scribe device according to the present invention comprises: a placement means (for example, a table and conveyer) on which a brittle material substrate is placed; a scribe head which is installed so as to face the brittle material substrate on said placement means; a holder joint which is installed on an end of said scribe head; a tip holder which is attached to said holder joint at its own one end with being freely detachable, has a wheel tip rotatably attached to the other end for forming a scribe line, and has a code recording offset data used for scribe; and a relative move part for moving said scribe head and said brittle material substrate relatively in a plane along a flat surface of the brittle material substrate (for example, in an x direction and y direction along a table surface when the placement means is a table), and correcting the offset by moving said scribe head relatively in x axis direction and y axis direction before the scribe based on the offset data retained in said tip holder.

To solve the problems, a scribe method according to the present invention using a scribe device comprising: a placement means on which a brittle material substrate is placed; a scribe head which is installed so as to face the brittle material substrate on said placement means; a holder joint which is installed on an end of said scribe head; and a tip holder which is attached to said holder joint at its own one end with being freely detachable, has a wheel tip rotatably attached to the other end for forming a scribe line, and has a code recording first offset data used for a scribe, comprising steps of: reading said first offset data of said tip holder when the tip holder is attached to the holder joint; when at least one of said scribe head and said holder joint is replaced, detecting an error of the attachment part by a test scribe and obtaining second offset data of a unit; performing correction processing by moving said scribe head relatively in x axis direction and y axis direction based on the first offset data of offset read from said tip holder and the second offset data of the unit; and scribing the brittle material substrate on the placement means by moving said scribe head and said brittle material relatively in a surface along a plane surface of the brittle material substrate (for example, in the x axis direction and y axis direction along a surface of the table when the placement means is a table).

Said relative move part may move said table in the x axis direction and the y axis direction.

Said relative move part may include a move part for moving said table in the y axis direction and a move part for moving said scribe head in the x axis direction.

Said relative move part may further include a rotation part for rotating said table in the plane of the brittle material substrate.

Said code may be a two-dimensional code.

Said code may include data showing a type of the wheel tip.

To solve the problems, a tip holder according to the present invention is capable of being installed in a holder joint of a scribe device with being freely detachable and comprises: a wheel tip for forming a scribe line rotatably attached to one end; and an installation part notched in one surface at the other end.

To solve the problems, a tip holder according to the present invention is capable of being installed in a holder joint of a scribe device with being freely detachable and comprises: a wheel tip for forming a scribe line rotatably attached to one end; an installation part notched in one surface at the other end; and a code recording inherent data in said tip holder on at least one surface of said tip holder.

Said code may be a two-dimensional code.

Said inherent data in the tip holder may include data indicating a type of the tip installed in said tip holder.

Said inherent data in the tip holder may include correction data for canceling offset of said tip holder in scribe.

Effectiveness of the Invention

According to the present invention having these features, since offset data of a tip is retained in a tip holder as a code, a correction data can be easily set to a scribe device by reading the code. As a result, measurement of an inherent offset to each tip holder is not required and a scribe can be easily started from a desired position.

BRIEF DESCRIPTION OF DRAWINGS

FIG. 4 is a view showing a state where the conventional tip holder is installed in the holder joint.

FIG. 8 is a perspective view showing an entire configuration of a scribe device according to an embodiment of the present invention.

FIG. 12 is a perspective view of the holder joint into which the tip holder is inserted according to the embodiment.

FIG. 15 is a block diagram showing a configuration of a control system of the scribe device according to the embodiment.

FIG. 17 is a view showing relationship of alignment marks, scribe start position of a tip, and offset data.

EXPLANATION OF REFERENCE NUMERALS

Figure 1:
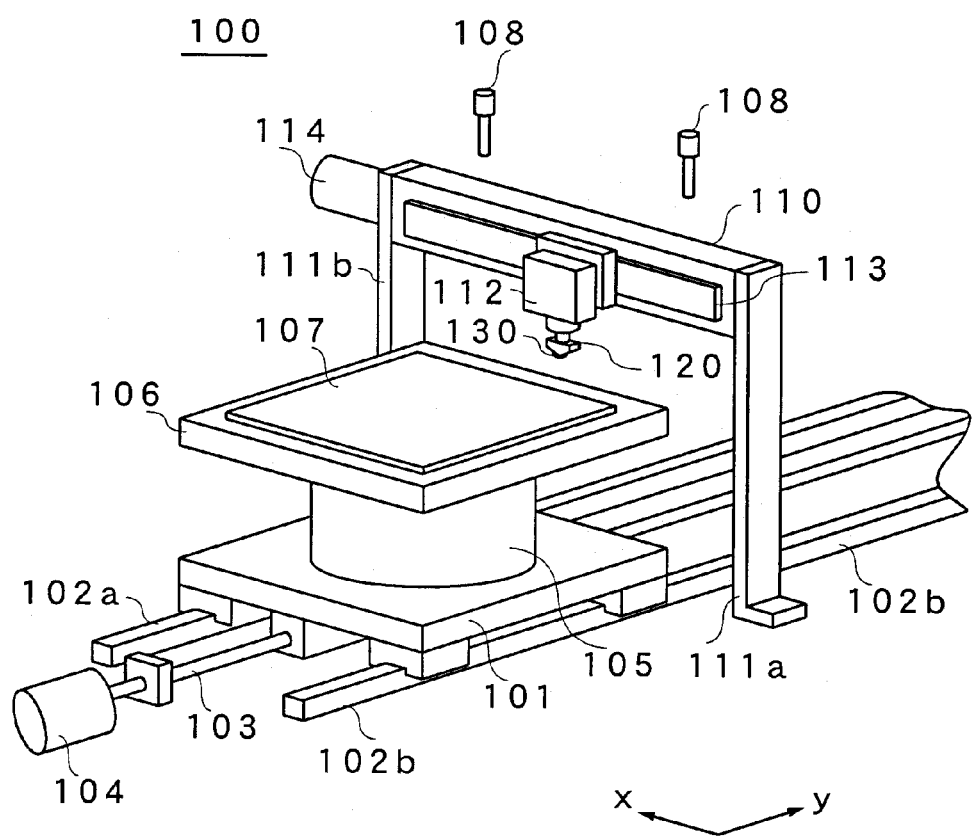
FIG. 1 is a perspective view showing an entire configuration of a conventional scribe device.
Figure 2:
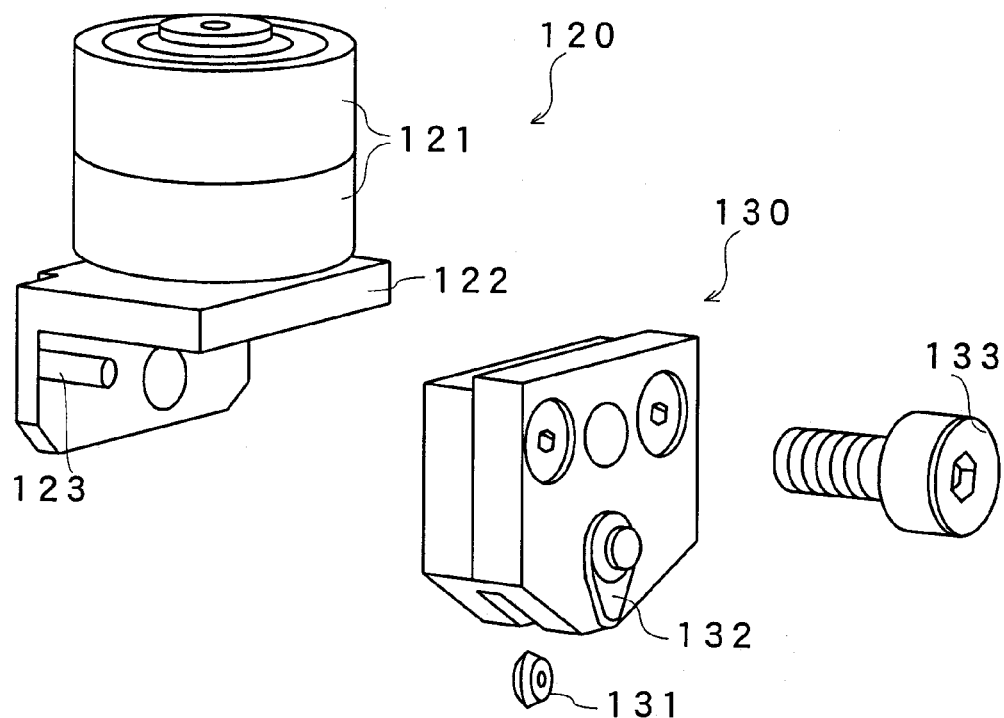
FIG. 2 is a perspective view showing a conventional holder joint and tip holder.
Figure 3:
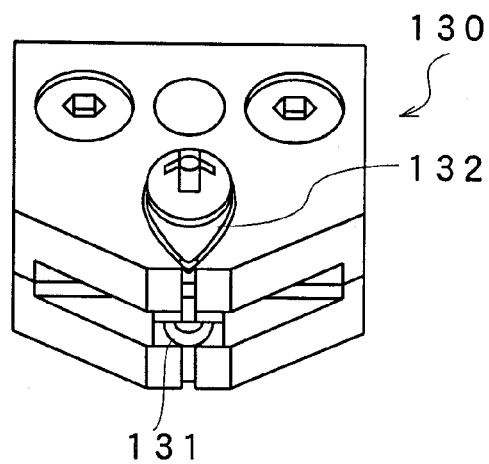
FIG. 3 is a perspective view showing the conventional tip holder.

1 Scribe device
10 Tip holder
11a, 11b, 16b Flat part
12 Notch
13 Pin groove
14 Tip
15 Pin
16 Installation part
16a Inclined part
17 2-dimensional code
20 Holder joint
21a, 21b Bearing
22 Retaining part
23 Opening
24 Magnet
25 Parallel pin
41 Image processing part
42 Control part
43 Correction value input part
44 X motor drive part
45 Y motor drive part
46 Rotation motor drive part
47 Tip holder elevation drive part
48 Monitor
112 Scribe head

BEST MODE FOR CARRYING OUT THE INVENTION

FIG. 8 is a perspective view showing a scribe device according to an embodiment of the present invention. The same reference numerals with the conventional example are added to the same parts as those of aforementioned conventional example in the scribe device. The scribe device 1 according to the present embodiment retains a moving base 101 to be freely movable in y axis direction along a pair of guide rails 102a and 102b. A ball screw 103 is fitted to the moving base 101 with screwing each other. The ball screw 103 revolves due to drive by a motor 104, and moves the moving base 101 in the y axis direction along the pair of guide rails 102a and 102b. A motor 105 is provided on an upper surface of the moving base 101. The motor 105 rotates a table 106 on a xy plane and positions the table at a predetermined angle. A brittle material substrate 107 is placed on the table 106 and retained by a vacuum suction means and the like which are not shown in the figure. Two CCD cameras 108 for imaging alignment marks of the brittle material substrate 107 are provided in an upper portion of the scribe device 1.

A bridge 110 is installed by support poles 111a and 111b along x axis direction so as to stride the moving base 101 and the table 106 on the base in the scribe device 1. A scribe head 112 is able to move in the direction of x axis along a guide 113 included in the bridge 110. A motor 114 moves the scribe head 112 along the x axis direction. A tip holder 10 mentioned below is attached to a tip portion of the scribe head 112 via a holder joint 120. The motor 104, the guide rails 102a and 102b, and the ball screw 103 configure a move part for moving a table in the y axis direction, the bridge 110, the support poles 111a and 111b, and the guide 113 configure a move part for moving a scribe head in the x axis direction, and, the motor 105 configures a rotation part for rotating the table, and these configure a relative move part.

Figure 9:
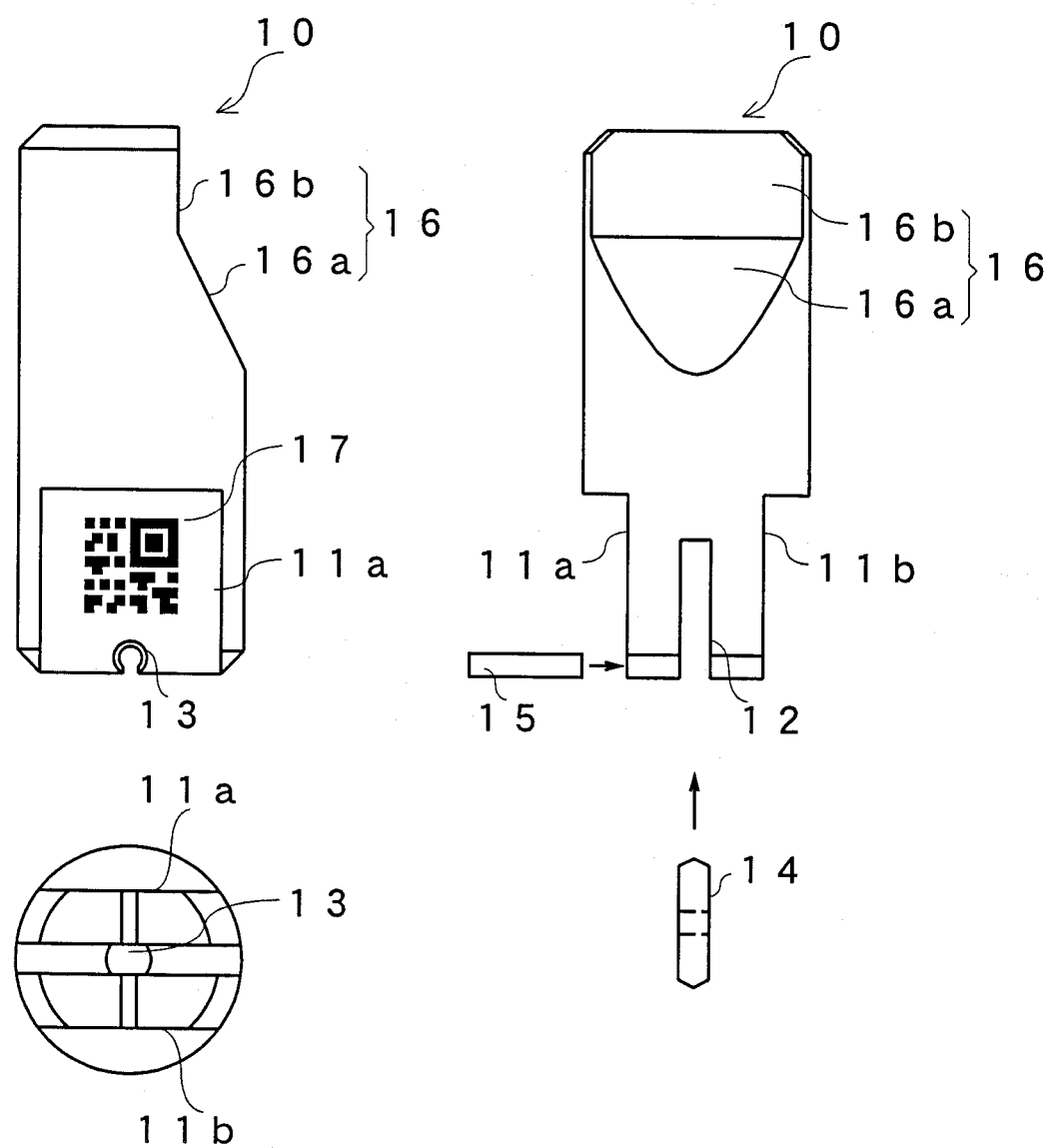
FIG. 9 is a view showing a configuration of a tip holder according to an embodiment of the present invention.
Figure 10:
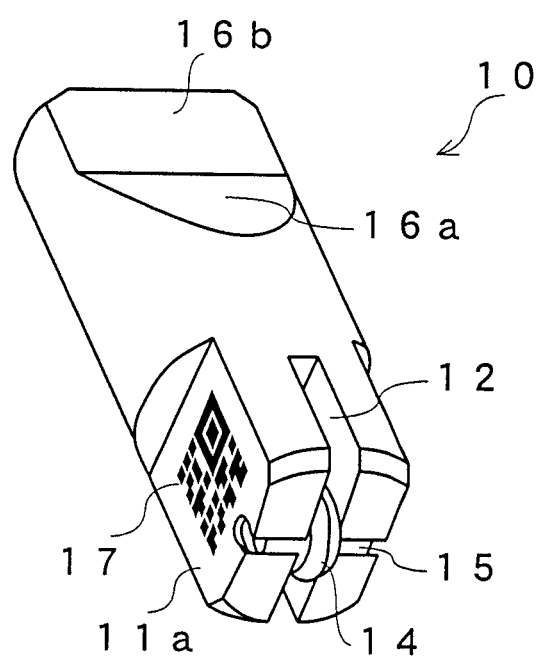
FIG. 10 is a perspective view of the tip holder according to the embodiment.

A configuration of the tip holder 10 according to the present embodiment, which is capable of being installed in the scribe head, will be described next. FIG. 9 is a view showing the tip holder according to the embodiment of the present invention, and FIG. 10 is a perspective view thereof. As shown in these figures, the tip holder 10 is a nearly cylindrical member and nearly square-shaped flat parts 11a and 11b are provided to one end of the member respectively parallel with a central axis. The tip holder 10 includes a notch 12 along the central axis between the flat parts and includes a pin groove 13 in bottom ends of the flat parts 11a and 11b perpendicular to their surfaces. The tip 14 has a discoid shape of approximately 2.5 mm in a wheel diameter and 0.5 mm in thickness for example, forms a cross section of its circular part in a conical shape, and includes a through-hole in center. The tip 14 is rotatably retained by allowing the pin 15 inserted to the pin groove 13 to penetrate through-hole in center. The tip is replaced with the tip holder without being uninstalled from the holder even when replacement of the tip is required after retaining the tip 14 by inserting the pin 15 into the pin groove 13. Meanwhile, the other end of the tip holder 10 includes an installation part 16 for positioning. The installation part 16 is formed by notching the tip holder 10 and includes an inclined part 16a and a flat part 16b. The flat part 16b is parallel to an axis of the tip holder and perpendicular to lower flat parts 11a and 11b. A 2-dimensional code 17 is printed on the flat part 11a as described below. In addition, an upper portion of the tip holder 10 is formed of a magnetic metal.

The scribe head 112 internally includes an elevation unit for allowing moving up and down of the tip holder 10 having a tip, for example, an air cylinder using an air pressure control or an electric elevation unit employing a linear motor. The elevation unit presses the tip 14 on a surface of a brittle material substrate at an appropriate pressure, and a scribe line is formed while the tip is rotated.

Figure 11:
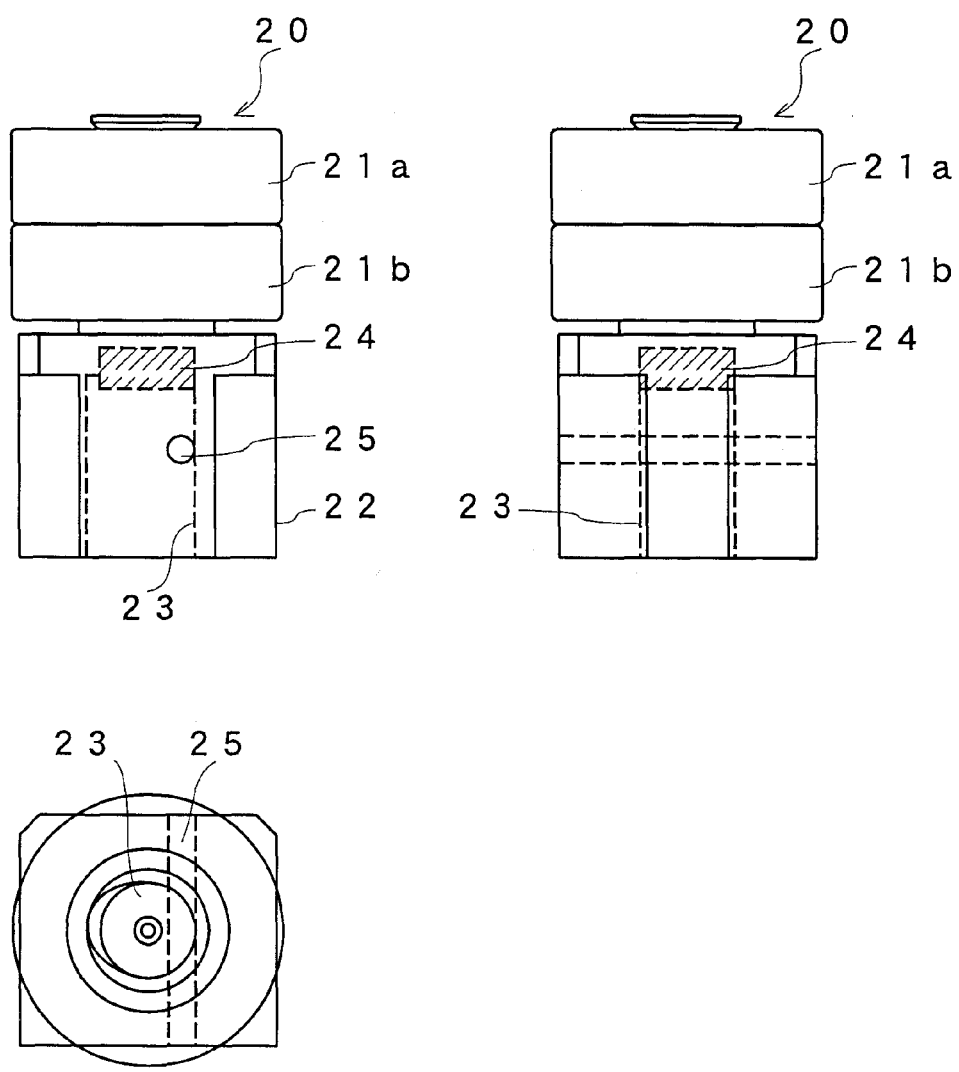
FIG. 11 is a view showing a holder joint according to the embodiment.

A holder joint 20 will be described next. FIG. 11 is a view showing the holder joint, and FIG. 12 is a perspective view showing a status where the tip holder 10 is inserted into the holder joint 20. As shown in these figures, the holder joint 20 has bearings 21a and 21b in its upper part and forms a retaining part 22 for retaining a tip holder in its lower part. The retaining part 22 of the holder joint 20 forms a circular opening 23 as shown in the figures, and a magnet 24 is embedded in its inside. A parallel pin 25 perpendicular to a center axis is also provided at a position apart from the center axis in inside of this opening 23. The parallel pin 25 touches on the inclined part 16a of the tip holder 10 to position the tip holder 10.

Figure 13:
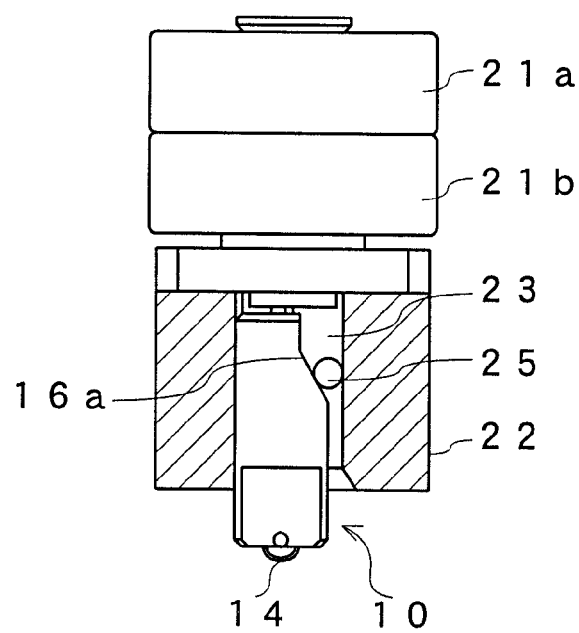
FIG. 13 is a partial section view showing the holder joint into which the tip holder is inserted.
Figure 14:
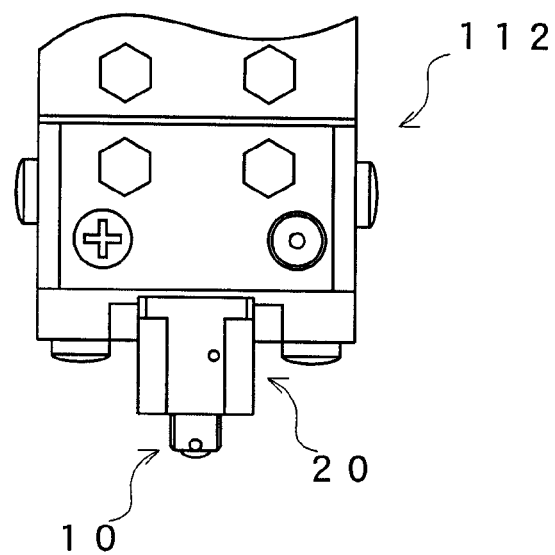
FIG. 14 is a view showing a state where the holder joint is installed in a scribe head.

When the tip holder 10 is installed in the holder joint 20, the installation part 16 of the tip holder 10 is inserted in the opening 23 of the holder joint as shown in FIG. 12. A tip part of the tip holder is, thus, attracted by the magnet 24 and the inclined part 16a touches on the parallel pin 25 to be positioned and fixed. FIG. 13 is a section view showing a status of installation of this holder, and FIG. 14 is a view showing a part of the scribe head 112 in which the holder joint 20 is installed. Since being only attracted by the magnet 24, the tip holder 10 is installed quite easily to be fixed at a desired position. The tip holder 10 can be easily uninstalled only by being pulled in a case of replacement and realizes easy installation and uninstallation.

A configuration of the scribe device 1 according to the present embodiment will be described next with referring to a block diagram. FIG. 15 is a block diagram showing a control system of the scribe device 1. In the figure, outputs from the two CCD cameras 108 are provided to a control part 42 via an image processing part 41. A unit correction value and correction data of the tip holder, mentioned below, are provided to the control part 42 via a correction value input part 43. The control part 42 provides data to an X motor drive part 44 and a Y motor drive part 45 so as to cancel offsets in the x direction and the y direction based on this correction value. The motor drive parts 44 and 45 directly drive motors 114 and 104, respectively. The rotation motor drive part 46 drives a motor 105, rotates a brittle material substrate 107 arranged on the table 106, and, when there is angular misalignment, cancels the angular misalignment. A tip holder elevation drive part 47 and a monitor 48 are further connected to the control part 42. The tip holder elevation drive part 47 drives the tip 14 so that the tip 14 can touch on a surface of the brittle material substrate at an appropriate pressure when the tip 14 rotates.

Figure 5A:
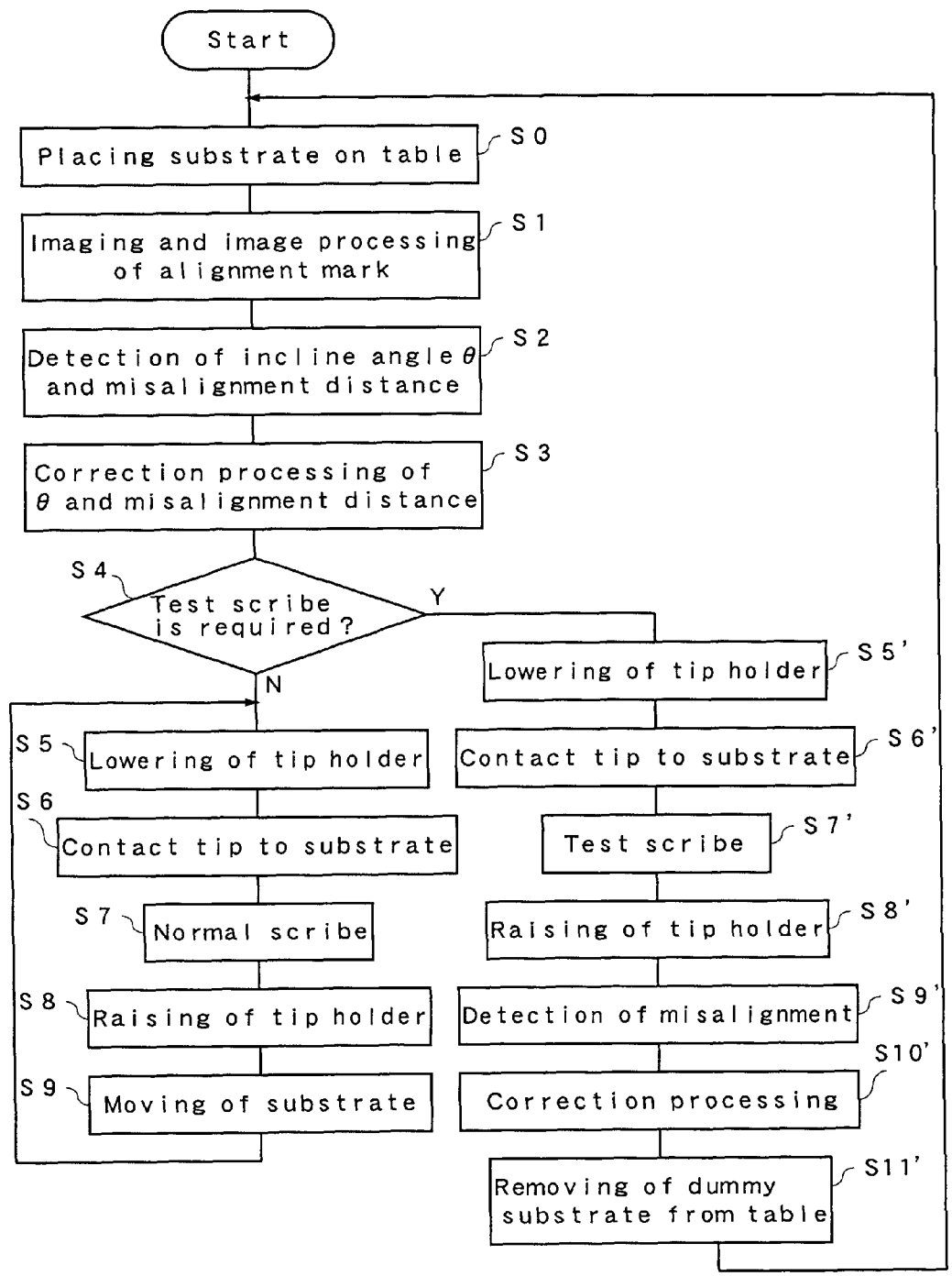
FIG. 5A is a flowchart showing conventional scribe processing.
Figure 5B:
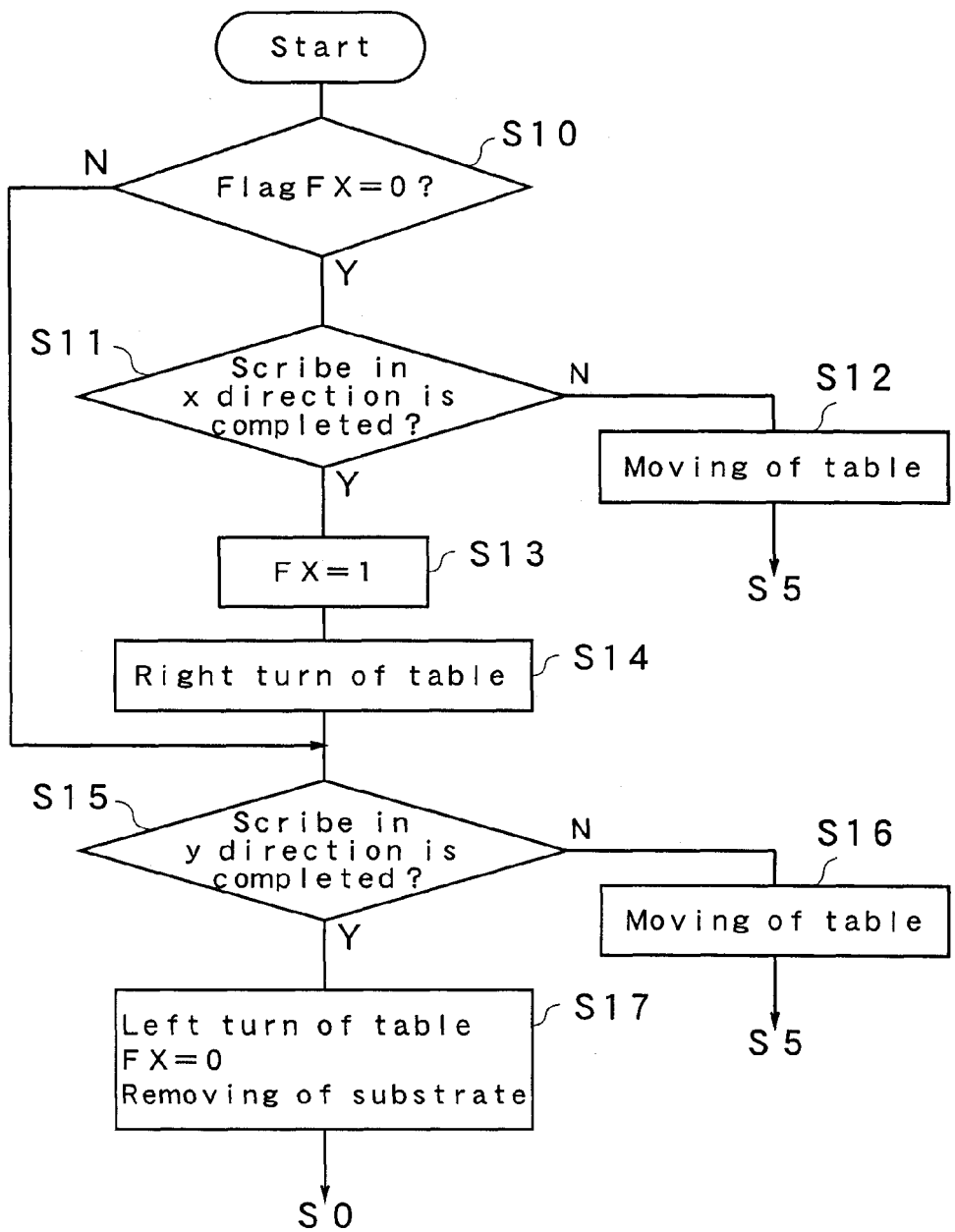
FIG. 5B is a flowchart showing move processing for a substrate in the conventional scribe processing.
Figure 6:
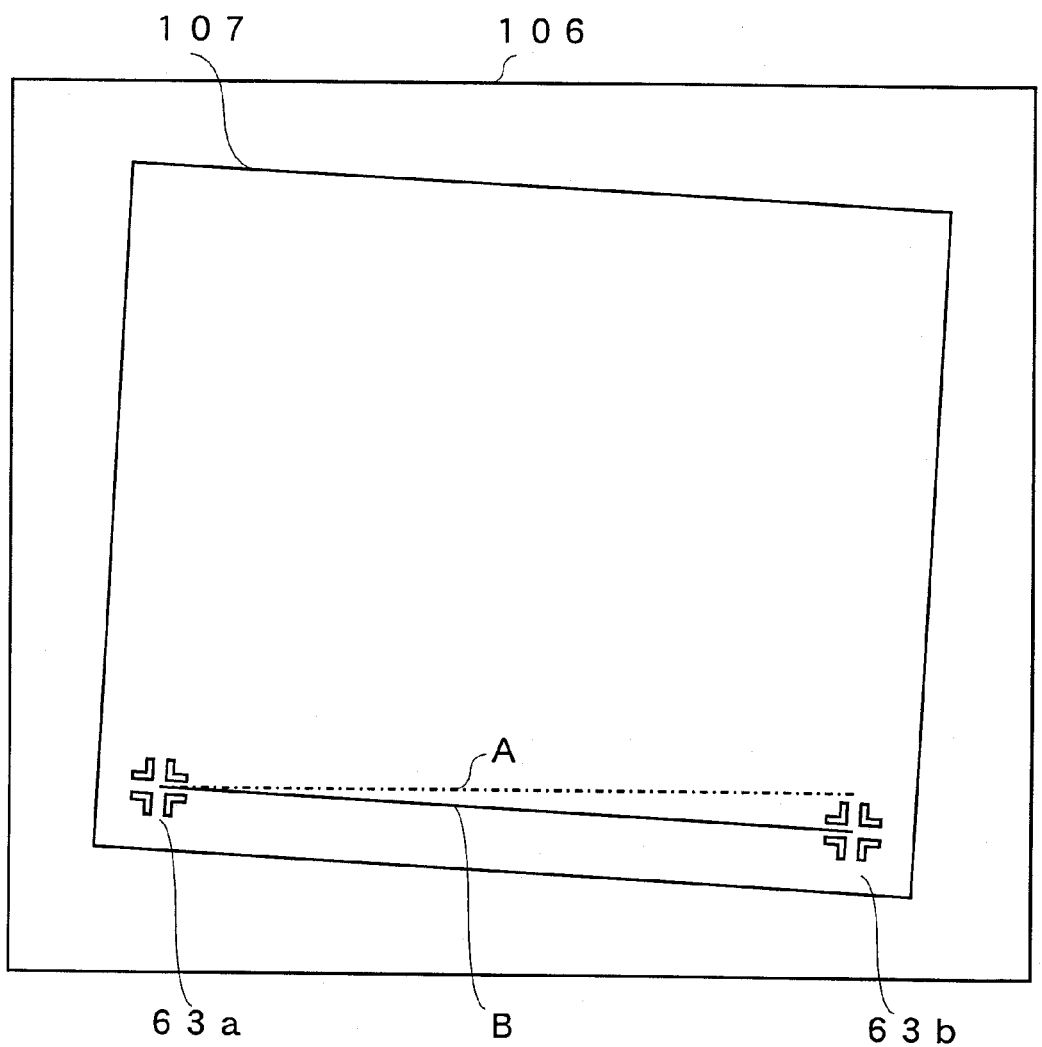
FIG. 6 is a view showing a state of alignment marks imaged by a CCD camera.
Figure 7:
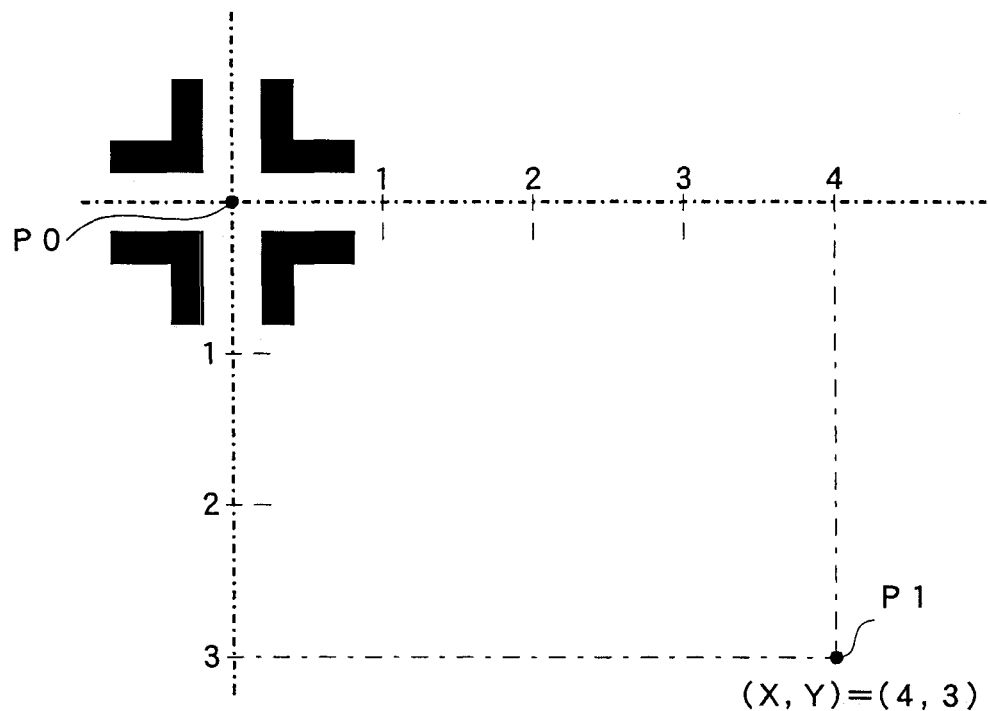
FIG. 7 is a view showing relationship of the alignment marks, scribe start position of a tip, and offset data.

Next, an operation of the present embodiment will be described with referring to flowcharts of FIG. 16A and FIG. 16B. When starting a scribe, the scribe device 1 performs processing from step S0 to S3 in the same manner as those in FIG. 5A for aforementioned conventional example. The scribe device 1 judges at step S4 whether or not test scribe is required, and performs almost the same processing as those of the aforementioned conventional example with progressing to step S5' if the test scribe is required. This processing will be explained below.

When using the scribe head 112 and the holder joint 20 after replacing a newly produced or old tip holder and newly installing them in the scribe device 1, adjustment in the following procedure is required so that an origin position and a moving direction of a drive system of the scribe device 1 can be accurately coincident with a start position where the tip 14 actually starts the formation of a scribe line on a substrate and a formation direction, respectively. When performing the test scribe after replacing the scribe head 112 or the holder joint 20, an operator preliminarily places a dummy substrate on the table. A correction value of the tip holder, for example, X=−1 and Y=−2 is assumed to be preliminarily inputted here. In addition, an offset value of the tip holder is assumed to X=0 and Y=0 when using the scribe device first. FIG. 17 is a view showing relationship of alignment marks marked on glass substrate etc. to be scribed and an actual scribe position of the tip holder. Assuming that center point of the alignment mark is set to a center coordinate P0, the scribe device 1 is able to start a scribe from the center coordinate P0 by performing correction for canceling an offset of the tip holder 10 when the scribe head 112 and the holder joint 20 are free from offsets.

The scribe cannot be started from the center coordinate P0 because of electric and mechanical errors. Then an operator lowers the tip holder and has the tip contact to the dummy substrate (steps S5' and S6'). The operator then performs the test scribe on the dummy substrate (S7') and subsequently measures a scribe start position after raising the tip holder at step S8'. The scribe start position (X,Y) of the tip is assumed to be a position P2(X,Y)=(3,1) as shown in FIG. 17 here. This position can be measured by using the CCD cameras 108. In a case of using a tip holder free from offset, an inherent offset (error) in a unit of the scribe head 112 and holder joint 20 is confirmed through this measurement when scribe starts with respect to the dummy substrate after lowering the tip.

A misalignment distance from the position P2 measured to the center coordinate is accordingly measured next (S9'). Since this misalignment distance is a value to be cancelled as the offset, the operator input a correction value for canceling the error of the unit by using this value (S12). A unit correction value (a second correction value) for canceling the offset is X=−3 and Y=−1 in this case.

After finishing this processing or in a case of test scribe being unnecessary, the scribe device 1 judges whether or not the tip holder 130 is replaced at step S21. The tip holder 10 is installed in the holder joint 20 as shown in FIG. 13, and further the holder joint 20 is installed in the scribe head 112 as shown in FIG. 14. Misalignment between the electric origin point and the scribe start position thus occurs when any one of them is replaced. The misalignment (offset) is caused by component accuracy, an assembly error and so on. The scribe head 112 and the holder joint 20 are replaced less frequently and their errors can be treated as fixed errors in a unit. Regarding the tip holder, since the tip holder 10 itself is replaced every time the tip has been worn and deteriorated in performance, frequent correction is required. An inherent offset value in the tip holder 10 is preliminarily measured at shipping of the tip holder 10 and the offset value (a first offset value) is recorded in the tip holder 10 itself as described above in the present embodiment. When the operator has replaced the tip holder, an offset value of the new tip holder 10 is read progressing to step S22. Then the operator inputs corresponding correction data from the correction value input part 43 (step S23).

The control part 42 adds a unit correction value to the correction value of the tip holder separately for X and Y as a total correction value at step S24. The total correction value is set to be X=−4 and Y=−3 in the above mentioned example and the correction processing is completed.

If the tip is directly lowered without inputting correction data of the tip holder 10 and without correcting the fixed error of the unit, the tip is lowered on a position P1 (X,Y)=(4,3) as shown in FIG. 17. In addition, when only the fixed error of the unit is corrected, the tip is lowered on a position P3 (X,Y)=(1,2) in FIG. 17. The correction data of the tip holder is added to the unit correction value accordingly in the scribe device 1. This results in a scribe starting from the center coordinate P0 in the normal scribe subsequent to step S5 shown in FIG. 16A.

Figure 16A:
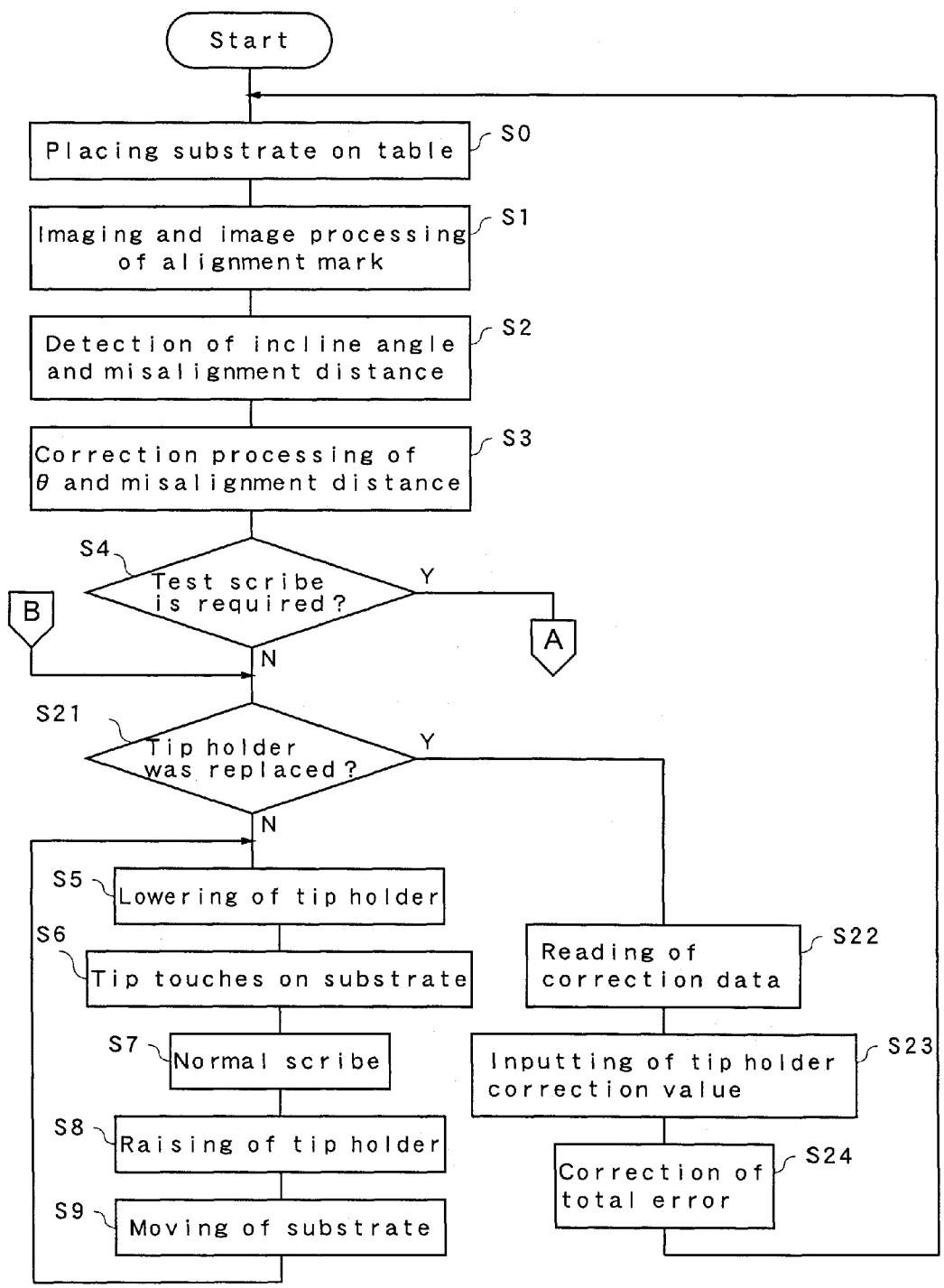
FIG. 16A is a flowchart showing a procedure of the scribe processing of the scribe device according to the embodiment.
Figure 16B:
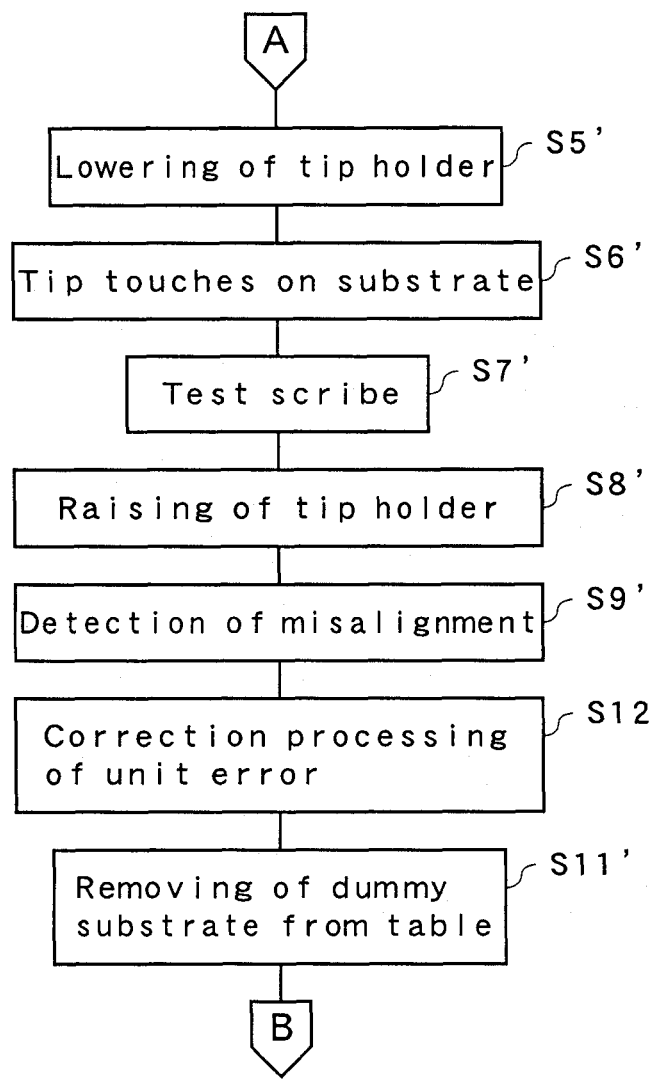
FIG. 16B is a flowchart showing a procedure of the scribe processing of the scribe device according to the embodiment.

After that, when scribe is performed on a new brittle material substrate, the scribe can be performed by implementing steps S5 to S9 after implementing steps S0 to S3 in the flowchart shown in FIG. 16A. That is to say, even when a brittle material substrate is replaced after an offset of a scribe head is corrected once, it is enough to perform processing of one-time correction after detecting a misalignment distance indicating how much the substrate is misaligned from a regular positioning point on a table at replacement of the substrate.

When the tip holder 10 is replaced after an initial correction, progressing to S22 from steps S1 to S4 and S21 as shown in FIG. 16A, a correction value recorded in the new tip holder 10 is read. The read correction data of the new tip holder 10 is further inputted in step S23. An entire correction is completed without performing the test scribe only by adding the correction value of the tip holder to the unit correction value already set in the scribe device at step S24 and setting the added value as a total correction value.

Consequently, a normal scribe can be performed by implementing steps S5 to S9 following steps S1 to S3 shown in FIG. 16A in a case of actual scribe after the correction processing. Since there is no need to perform the correction processing (step S5' to S11') for canceling the offset associated with an installation offset of the tip holder, after an operator places a dummy substrate on the table, forms a scribe line on the dummy substrate on trial, and corrects misalignments in both of positioning point and direction of the substrate as in conventional way, the correction operation can be considerably reduced.

Measurement of the inherent offset in the tip holder performed at shipment will be explained. A scribe start position of the tip in the tip holder is confirmed by using a device, the unit error of which is preliminarily 0 or a device, the unit error of which is already known in this case. Offset data is, then, obtained based on the scribe start position. A value for canceling the data is set as correction data.

Figure 18A:
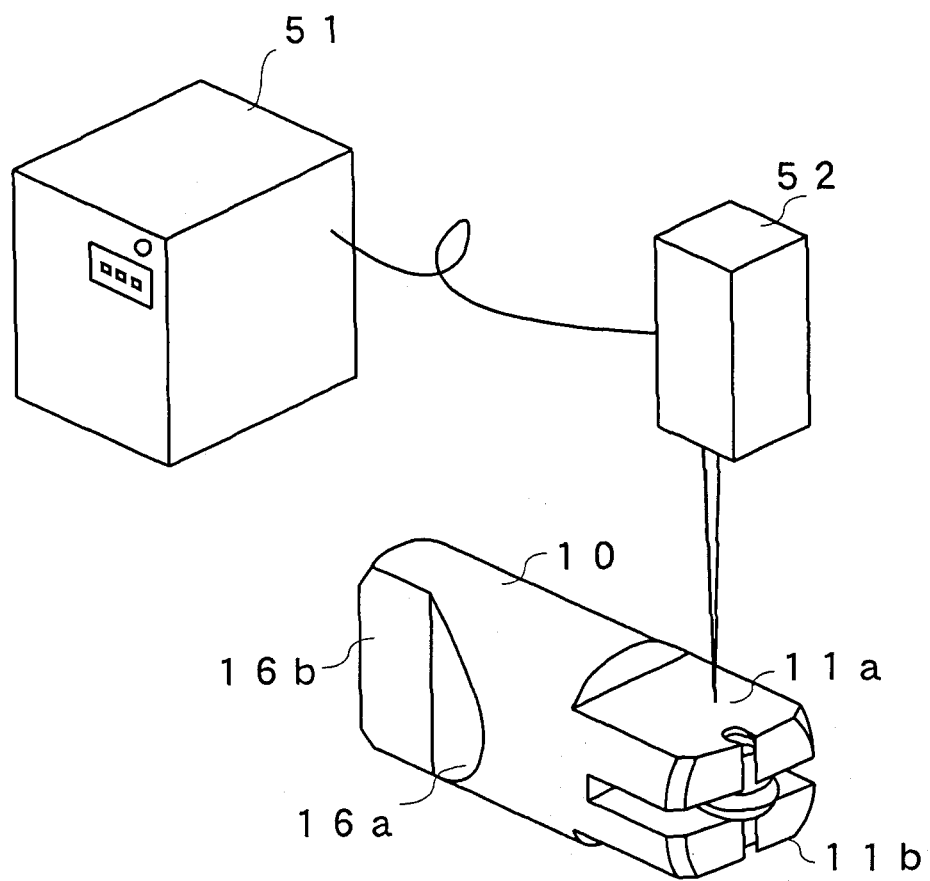
FIG. 18A is an outlined pattern diagram showing processing of writing 2-dimensional data into the tip holder.
Figure 18B:
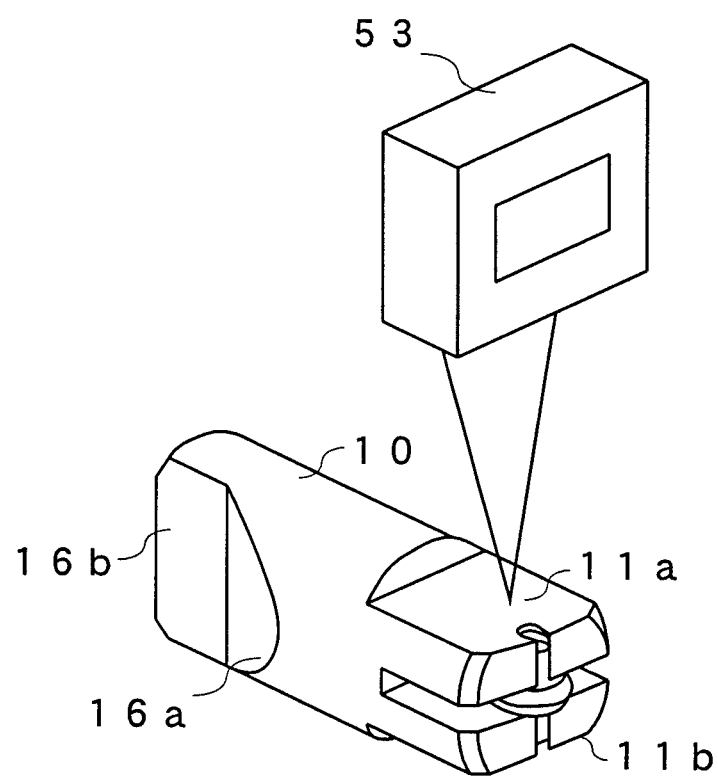
FIG. 18B is an outlined pattern diagram showing processing of reading 2-dimensional data to the tip holder.

A recording method of this offset data will be explained next. A code is recorded in the flat parts 11a and 11b of the tip holder 10 as shown in FIG. 18A and FIG. 18B in the present embodiment. The code may be recorded by using a one-dimensional code, for example, a bar-code, however, it is advantageous that the code is two-dimensional since the code requires a small recording area. Much information can be recorded by the two-dimensional code in smaller area than that of the one-dimensional code. In addition, the two-dimensional code includes a data restore function, and even when stain or corruption in a part of data occur, they can be restored and read by a reading sensor. FIG. 18A and FIG. 18B are views schematically showing a status of writing and reading the two-dimensional code to and from the tip holder 10. Data to be recorded is set by a controller 51 of a laser marker and a pattern of the two-dimensional code is formed in FIG. 18A. The data to be recorded, a type of the tip and preliminarily measured offset data, are formed into the two-dimensional code. A head part 52 directly writes the code on at least one of the flat parts 11a and 11b of the tip holder 10. FIG. 9 and FIG. 10 show a two-dimensional code 17 written on the flat part 11a in this manner. When a tip holder is replaced in order to replace the tip, a reader 53 reads the two-dimensional data as shown in FIG. 18B before a new tip holder is used. This allows confirming a type of the tip based on the read data. Moreover, data correction processing associated with the replacement of the tip can be implemented quite easily by manually or automatically inputting an offset value to the control part of the scribe device as described above.

The two-dimensional code is directly written on the tip holder 10 in the present embodiment, however, a label on which the two-dimensional code is written may be attached on the holder. In addition, the two-dimensional code is written on the flat part 11a or 11b of the tip holder in the present embodiment, however, the code may be recorded on the inclined part 16a and the flat part 16b and further recorded on a surface of the cylindrical part.

A type of the tip and offset data are recorded as the two-dimensional code in the present embodiment, however, date of manufacture, lot number and so on of the tip holder may be recorded in addition to the data. Furthermore, the pattern recorder of the two-dimensional code may be a recorder other than the laser marker and a wireless portable reader may be used as the data reader.

Inherent data in the tip holder is recorded as the two-dimensional data in the present embodiment, however, a closely contact-type data carrier may be used as the recording medium. The data carrier is installed in the flat part 16a of the tip holder and a read-write unit having a function for reading and writing data is arranged in a part facing the data carrier of the holder joint in this case. This allows writing and reading a code without using a recorder, a reading sensor and so on in data reading and allows using the code.

An offset value is recorded as the two-dimensional code in the tip holder in the present embodiment. Alternatively, correction may be performed by recording data for canceling the offset value in the tip holder and inputting a correction value for canceling the offset value to the scribe device.

A case where the present invention is applied to another type of scribe device will be described next. There is a device in which a table does not rotate and moves only in the x axis direction and the y axis direction as another type of scribe device. There is also a scribe device where a scribe head moves in the x axis direction and the y axis direction. Instead of a θ correction, these cases require a correction equal to θ by checking the alignment marks.

In a case of a scribe device which does not have a rotation table on the moving base 101 and directly places the brittle material substrate 107 on the moving base, the correction of an angle θ in step S2 in FIG. 16A is impossible. If correction processing is performed in a manner similar to aforementioned case on this occasion, scribe is started from a desired position, for example, the center coordinate P0 of the alignment mark, however, if angular misalignment also exists, resulting in misalignment of termination point of the scribe. In this case, the angular misalignment can be cancelled based on the method of linear interpolation same as the conventional way.

A multi scribe device having a plurality of heads is also employed. When each head is used, positioning is required so as to eliminate offset in accordance with correction data in this case. Also in a case of a scribe device installing a pair of scribe heads arranged up and down to simultaneously scribe both of upper and lower sides of a panel substrate formed by laminating two brittle material substrates, the same tip holder can be employed. Also in a case of a scribe device where a scribe head moves in both of an x axis and y axis directions, where a tip holder is rotatably retained in an xy plane, and where a scribe head configured so that a scribe line formed by a tip can draw a curved line is installed, data correction of scribe start position can be easily performed in short time after replacement of the tip when the tip holder of the present invention is employed.

INDUSTRIAL APPLICABILITY

The present invention relates to a scribe device and scribe method for forming a scribe line on a brittle material substrate, and relates to a tip holder used thereto, and, since retaining offset data of the tip holder in the tip holder as a code, the present invention is able to easily set correction data to the scribe device by reading the code. Therefore, because the present invention does not require measurement of the inherent offset in the tip holder, the present invention is able to start a scribe from a desired position easily, and thereby useful in a scribe process for a glass substrate.

The invention claimed is:

1. A scribe device comprising:
a placement means on which a brittle material substrate is placed;
a scribe head facing the brittle material substrate on said placement means;
a holder joint installed on an end of said scribe head, said holder joint comprising an opening;
a tip holder comprising a wheel tip, a wheel tip pin, an installation part, a side surface, a first extent and a second extent, at least a portion of said tip holder having a circular pillar shape, said first extent and said second extent extending from one end portion of said installation part, said first extent being parallel to said second extent, said side surface being parallel to a longitudinal axis of said tip holder, said first extent comprising a first extent planar surface, said second extent comprising a second extent planar surface, said first extent and said second extent defining a wheel tip receiving space, said first extent comprising a first pin groove portion, said second extent comprising a second pin groove portion, said first pin groove portion and said second pin groove portion defining a common pin receiving groove, said common pin groove receiving said pin, said common pin groove being perpendicular to said first extent planar surface and said second extent planar surface, said installation part comprising a planar installation part surface and an installation part inclined portion at another end thereof, said another end being opposite said first extent and said second extent, said side surface being located between said installation part inclined portion and at least one of said first extent and said second extent and, said installation part inclined portion being located between said planar installation part surface and said side surface, said tip holder being detachably connected to said holder joint, wherein at least a portion of said tip holder is inserted in said opening, at least said planar installation part surface and said installation part inclined portion being arranged in said opening, at least a portion of said wheel tip being arranged in said wheel tip receiving space, said wheel tip being rotatably attached to said first extent and said second extent via said wheel tip pin for forming a scribe line;
a tip holder pin, said tip holder being fixed in said opening via at least said tip holder pin, wherein said tip holder does not rotate in said opening via said tip holder pin, said holder joint having a holder joint groove, at least a portion of said tip holder pin being arranged in said holder joint groove, wherein said tip holder pin extends from one portion of said holder joint to another portion of said holder joint, said one portion of said holder joint being opposite said another portion of said holder joint, at least a portion of said tip holder pin engaging said installation inclined portion; and
a relative move part for moving said scribe head and said brittle material substrate relatively in a plane along a flat surface of the brittle material substrate.

2. The scribe device according to claim 1, wherein
said tip holder has a code recording offset data used for a scribe, and
said relative move part corrects the offset by moving said scribe head relatively in x axis direction and/or y axis direction before the scribe based on the offset data retained in said tip holder.

3. The scribe device according to claim 2, wherein
said code is a two-dimensional code.

4. The scribe device according to claim 2, wherein
said code includes data showing a type of the wheel tip.

5. A scribe method using a scribe device comprising:
providing a placement means on which a brittle material substrate is placed;
providing a scribe head, said scribe head facing the brittle material substrate on said placement means;
providing a holder joint, said holder joint being installed on an end of said scribe head, said holder joint comprising a circumferential inner surface and a holder joint groove, said circumferential inner surface defining a tip holder receiving opening;
providing a tip holder comprising a first tip holder projection, a second tip holder projection, a pin, a wheel tip, a side surface and an installation part, at least a portion of said tip holder comprising a circular columnar shape, said first tip holder projection and said second tip holder projection provided at one end of said installation part, said first tip holder projection being parallel to said second tip holder projection, said first tip holder projection comprising a first tip holder projection planar surface, said second tip holder projection comprising a second tip holder projection planar surface, said first tip holder projection and said second tip holder projection defining a wheel pin receiving space, said first tip holder projection comprising a first pin receiving space, said second tip holder projection comprising a second pin receiving space, said first pin receiving space and said second pin receiving space defining a common pin receiving space, said common pin receiving space being perpendicular to said first tip holder projection planar surface and said second tip holder projection planar surface, said wheel tip being rotatably attached to said first tip holder projection and said second tip holder projection via said pin, wherein said pin extends through said common pin receiving space, said installation part comprising a planar installation surface and an inclined installation part at another end thereof, said another end being opposite said first tip holder projection, said second tip holder projection and said one end, said inclined installation part extending continuously, without interruption, from said planar installation surface to said side surface, said tip holder being detachably connected to said joint holder via said installation part;

providing another pin;

inserting at least a portion of said tip holder in said tip holder receiving opening, said planar installation surface and said inclined installation part being arranged in said tip holder receiving opening, at least a portion of said circumferential inner surface surrounding said installation part, at least a portion of said tip holder engaging said circumferential inner surface;

fixing said tip holder in said tip holder receiving opening with at least said another pin such that said tip holder is non-rotatable in said tip holder receiving opening with respect to said holder joint and said tip holder is fixed in an axial position, at least a portion of said another pin being inserted in said holder joint groove, wherein said another pin extends continuously from one side of holder joint to another side of said holder joint, wherein at least a portion of said another pin is arranged in said tip holder receiving opening, said another pin being in contact with said inclined installation part;

moving said scribe head and said table relatively in an x axis direction and a y axis direction along a surface of the table to scribe the brittle material substrate on the table.

6. The scribe method according to claim 5, wherein said tip holder has a code recording first offset data used for a scribe, comprising steps of:

reading said first offset data of said tip holder when the tip holder is attached to the holder joint;

when at least one of said scribe head and said holder joint is replaced, detecting an error of the installation part by a test scribe and obtaining second offset data of a unit;

performing correction processing by moving said scribe head relatively in x axis direction and y axis direction based on said first offset data of offset read from said tip holder and said second offset data of the unit; and performing a positioning correction and scribe by relatively moving said scribe head and said table in the x axis direction and the y axis direction along a surface of the table.

7. The scribe method according to claim 6, wherein said code is a two-dimensional code.

8. The scribe method according to claim 6, wherein said code includes data showing a type of the wheel tip.

9. A tip holder capable of being installed in an opening of a holder joint of a scribe device with the tip holder being freely detachable from the opening of the holder joint, the tip holder comprising:

a pair of flat parts provided to one end of the tip holder, said pair of flat parts being parallel to each other;

a notch defined between said pair of flat parts;

a pin groove provided in said pair of flat parts, said pin groove being perpendicular to said pair of flat parts;

a pin;

a wheel tip, said pin being inserted in said pin groove, said wheel tip being rotatably retained in said notch via said pin for forming a scribe line, wherein said wheel tip is rotatably attached to one end of said notch; and an installation part, said installation part being notched from one surface at an opposite end of said pair of flat parts to a side surface of the tip holder, said installation part comprising an inclined part and a complementary outer surface, said inclined part comprising a pin engaging surface, said pin engaging surface defining at least a portion of a means for non-rotatably fixing said installation part relative to the holder joint, said complementary outer surface defining a holder joint contact means for contacting the holder joint, said pair of flat parts and at least a portion of said installation part defining a circular pillar shape tip holder contour.

10. A tip holder capable of being installed in an opening of a holder joint of a scribe device with the tip holder being freely detachable from the opening of the holder joint, the tip holder comprising:

a tip holder structure, at least a portion of said tip holder structure having a circular pillar shape, said tip holder structure comprising a first extent, a second extent, a pin, a wheel tip for forming a scribe line, a side surface, an installation part and a code recording inherent data on at least one surface of said tip holder structure, said installation part comprising an installation part outer surface, said installation part outer surface comprising an installation part planar surface portion and an inclined portion, said inclined portion defining a pin contacting means for contacting a pin such that said tip holder structure does not rotate relative to the holder joint, said inclined portion being adjacent to said installation part planar surface portion and said side surface, wherein said inclined portion is located between said side surface and said installation part planar surface portion, said installation part further comprising a holder joint engaging surface portion for engaging an inner surface of the holder joint, said inclined portion extending at an angle relative to said installation part planar surface, said angle being greater than zero degrees and less than ninety degrees, said first extent and said second extent being provided at one end of said installation part, said first extent being parallel to said second extent, said first extent and said second extent defining a wheel tip receiving space, said first extent comprising a first extent planar surface and a first pin groove, said first pin groove being perpendicular to said first extent planar surface, said second extent comprising a second extent planar surface and a second pin groove, said second pin groove being perpendicular to said second extent planar surface, said wheel tip being rotatably connected to said first extent and said second extent via said pin, wherein said first pin groove receives one portion of said pin and said second pin groove receives another portion of said pin, said installation part planar surface portion and said inclined portion being located at another end of said installation part, said another end being opposite said one end.

11. The tip holder according to claim 10, wherein said code is a two-dimensional code.

12. The tip holder according to claim 10, wherein said inherent data includes data indicating a type of the tip to be installed.

13. The tip holder according to claim 10, wherein said inherent data includes correction data for canceling offset of said tip holder in scribe.

14. The scribe device of claim 1, wherein said first extent planar surface and said second extent planar surface are perpendicular to said planar installation part surface, said joint holder comprising a joint holder inner surface, said joint holder inner surface defining said opening, at least a portion of said joint holder inner surface extending about said installation part, whereby at least an outer portion of said tip holder is in direct contact with at least a portion of said joint holder inner surface, said holder joint comprising a holder joint longitudinal axis, said opening extending in an axial direction with respect to said holder joint longitudinal axis, said first extent being located at a spaced location from said second extent, wherein a first dimension of said tip holder increases from said planar installation part surface to said side surface, said installation part inclined portion defining at least a portion of said first dimension, said side surface defining at least a portion of a second dimension of said tip holder, said planar installation part surface defining at least a portion of a third dimension of said tip holder, said third dimension being less than said first dimension and said second dimension, said first dimension being less than said second dimension.

* * * * *